(12) United States Patent
Wang et al.

(10) Patent No.: US 8,059,575 B2
(45) Date of Patent: Nov. 15, 2011

(54) SERVICE TRANSMITTING METHOD OF MOBILE MULTI-MEDIA BROADCASTING NETWORK

(75) Inventors: Biao Wang, Shenzhen (CN); Xiangbiao Yan, Shenzhen (CN); Xiaoguang Zhu, Shenzhen (CN); Hailong Wen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 474 days.

(21) Appl. No.: 12/440,452

(22) PCT Filed: Dec. 29, 2006

(86) PCT No.: PCT/CN2006/003668
§ 371 (c)(1),
(2), (4) Date: Mar. 16, 2009

(87) PCT Pub. No.: WO2008/037137
PCT Pub. Date: Apr. 3, 2008

(65) Prior Publication Data
US 2010/0043031 A1    Feb. 18, 2010

(30) Foreign Application Priority Data
Sep. 26, 2006 (CN) .......................... 2006 1 0152341

(51) Int. Cl.
*H04H 20/75* (2006.01)
(52) U.S. Cl. ....................................... 370/312; 370/345
(58) Field of Classification Search .................. 370/312, 370/345
See application file for complete search history.

(56) References Cited

U.S. PATENT DOCUMENTS 7,623,503 B2 * 11/2009 An et al. ........................ 370/345
2005/0207365 A1 * 9/2005 Balachandran et al. ...... 370/312

\* cited by examiner

*Primary Examiner* — Kevin C Harper
*Assistant Examiner* — Sai-Ming Chan
(74) *Attorney, Agent, or Firm* — Trojan Law Offices

(57) ABSTRACT

A service transmitting method of mobile multimedia broadcasting network is disclosed. The sending side of the system adds an updating indication of multiplexing configuration information in the service information slice for indicating whether the information of a next frame is updated, sends information to the receiving terminal, and sends an updating indication of information to the terminal in advance; the terminal acquires the service needed according to the information received at the beginning and monitors whether the information is going to change by monitoring the updating indication, the terminal stops monitoring and records the updating indication in case monitors an updating indication; for receiving other services, the terminal inquires whether any updating notice is recorded, if recorded, the terminal re-acquires the current information, according to which the service needed is acquired and at the same time removes the original updating indication and re-starts to monitor the updating indication of information.

8 Claims, 2 Drawing Sheets

SERVICE TRANSMITTING METHOD OF MOBILE MULTI-MEDIA BROADCASTING NETWORK

CROSS-REFERENCE TO RELATED APPLICATIONS

The present application is a U.S. National Stage Application under 35 U.S.C. 371 of PCT/CN2006/003668, filed on Dec. 29, 2006, which claims priority to Chinese Patent Application 200610152341.6, filed on Sep. 26, 2006.

BACKGROUND OF THE INVENTION

1. Field of the Invention

The present invention relates to digital mobile communication field, specifically relates to a service transmitting method of mobile multimedia broadcasting network.

2. Description of Related Art

In recent years, technologies and standards of digital mobile multimedia broadcasting have developed rapidly, such as DVB-H (Digital Video Broadcast Handheld) of Europe, Media FLO (Media Forward Link Only) of the USA, CMMB (China Mobile Multimedia Broadcast) of China and so on.

Compared with analog technologies, one of the advantages of the digital mobile multimedia broadcasting network is that a broadcasting channel can support transmissions of a plurality of services by multiplexing on the premise of satisfying the requirements on service qualities so that the utilization efficiency of radio resource can be greatly increased. We call the data obtained by multiplexing of a plurality of services within a certain time a broadcast frame. For the receiving terminal, as there are a plurality of services on a broadcast frame, the terminal needs information which we call multiplexing configuration information and can exactly describe the broadcast channel resource each service used in the present broadcast frame to receive one or more services needed rapidly and exactly. Multiplexing configuration information is generated by the sending terminal when multiplexing occurs and is sent to the terminal in one same broadcast frame.

In consideration of reducing the receiving power consumption of a mobile multimedia receiving terminal, all mobile multimedia broadcasting technologies have adopted various methods to reduce the working time of the receiving terminal. In addition to service data compression, another two methods are also widely used:

Time slicing technology, in which a broadcast frame is further divided into a plurality of time slices and one time slice only bears one service, thus the receiving terminal only needs to receive the time slice needed and needless to receive the whole broadcast frame, if only needing to receive one service.

Multiplexing configuration information and service data use different time slices, so as to reduce the number of spending information in service data or in other words to increase the proportion of services payload data on time slices, so that lengths of time slices can be further reduced, which leads to reducing of the working time of the receiving terminal.

There are many design methods for broadcast frames used by various mobile multimedia broadcasting technologies, but basic constitutions of broadcast frames are similar.

We call the time slice in which multiplexing configuration information is located multiplexing information time slice and the time slice in which a service is located service time slice. In this manner, the receiving terminal can receive the service needed normally only by acquiring the multiplexing information time slice and the service time slice needed in each frame. If the times of reading spending time slices by the receiving terminal can be reduced, the working time of the receiving terminal can also be further reduced so that the design of mobile multimedia broadcasting system can have a better feature of current saving. Various mobile multimedia broadcasting technologies have designs for this point. Below are two common methods:

Method A: adding interval time indication information in the service time slice, the information used to indicate the time when the next service time slice of the present service appears. This technology has been applied in DVB-H system. The problem of this method is that when a broadcast frame bears services having variable rate, each interval time may be varied and the receiving terminal needs to acquire interval time indication information from each service time slice no matter whether data rate of the service currently received by the receiving terminal is variable or not.

Method B: auxiliary multiplexing information with a fixed length is added in the service time slice, for a broadcast frame has a fixed time length (such as 1 sec.). Whether multiplexing configuration information of the present service will be changed in the next frame and corresponding multiplexing configuration information or filling are provided in the auxiliary multiplexing information, according to which the receiving terminal can receive the service needed. Only when needing to receive other services, the receiving terminal needs to receive the multiplexing information time slice. However, this method also has a problem of increasing the processing complexity of the receiving terminal.

For a mobile multimedia broadcasting network, the services most commonly used by users are the real-time services which are continuously broadcasted such as television and audio broadcast. The feature of this kind of service in the broadcasting process is that the average data rate can be considered to be fixed and as long as the coverage area or service quality is not adjusted by broadcast operator, the broadcast channel resource (the size of time slice) needed by this kind of service can also be fixed.

If this kind of service application is prevailing, the existing methods not only increase additional spending but the procedure of receiving processing of the receiving terminal is also relatively complex.

BRIEF SUMMARY OF THE INVENTION

The object of the present invention is to provide a service transmitting method of mobile multimedia broadcasting network to reduce the working time of the receiving module in the mobile multimedia broadcasting system receiving terminal and to better save current.

The technical solution of the present invention is as follows:

A service transmitting method of mobile multimedia broadcasting network, characterized in, comprising the following steps:

(1) a sending side of a mobile multimedia broadcasting system generates a broadcast frame in a fixed time period, implements multiplexing to different services according to service types and generates multiplexing configuration information, wherein a corresponding updating indication of the multiplexing configuration information is added in each service information slice as auxiliary spending information for indicating whether multiplexing configuration information of a next frame is updated;

(2) the sending side of the mobile multimedia broadcasting system firstly sends multiplexing configuration information to a receiving terminal at the beginning of a frame and sends the updating indication of the multiplexing configuration information to the receiving terminal in advance when the multiplexing configuration information needs to be changed;

(3) when using services of the mobile multimedia broadcasting system, the receiving terminal firstly receives a multiplexing configuration information, then acquires the service needed according to the received multiplexing configuration information, and monitors whether the multiplexing configuration information is going to change by monitoring the updating indication; the receiving terminal stops monitoring and records the update situations once monitors a decided updating indication;

(4) when other services in addition to the current service needs to be received, the receiving terminal inquires whether situations of multiplexing configuration information update are recorded; if yes, the receiving terminal re-acquires multiplexing configuration information according to which the service needed is acquired, removes the recorded update situations and re-starts to monitor the updating indication of multiplexing configuration information.

In the above step (1), the mobile multimedia broadcasting system further informs the receiving terminal of the service type of each service by sending a service type notice.

The service types comprise fixed rate services and variable rate services. The service type notice is achieved by adding service type information in multiplexing configuration information. The service types comprise fixed rate services and variable rate services.

The updating indication comprises a fixed rate service configuration updating indication and a variable rate service configuration updating indication.

In the step (2), the sending side of the mobile multimedia broadcasting system sends an updating indication of multiplexing configuration information to the receiving terminal in advance of one frame when the multiplexing configuration information needs to be changed.

In the step (3), it is further comprised that the receiving terminal caches the original multiplexing configuration information.

In the step (4), when other service in addition to the current service needs to be received, the receiving terminal acquires the service needed by using the saved multiplexing configuration information if there is no updating indication.

The present invention provides a method in the mobile multimedia broadcasting network that can not only reduce the times that the receiving terminal acquires multiplexing configuration information but can also reduce the number of auxiliary spending information using the auxiliary spending information and the properties of the service needed by the receiving terminal, so that the working time of the receiving module in the receiving terminal of the mobile multimedia broadcasting system receiving terminal is reduced, which renders that current can be better saved, the processing complexity of the receiving terminal can be reduced and less auxiliary multiplexing information is used.

DETAILED DESCRIPTION OF THE INVENTION

The present invention will be described in details in combination with the figures. If not conflict, the embodiments and the details of the embodiments below can be combined.

Figure 1:
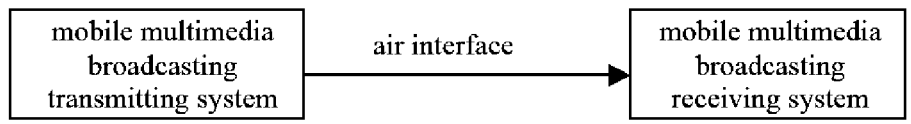
FIG. 1 is a diagram schematically showing the constitution of the mobile multimedia broadcasting system.

As shown in FIG. 1, the mobile multimedia broadcasting network system is mainly composed by a mobile multimedia broadcasting transmitting system and a mobile multimedia broadcasting receiving system (terminal), the interface between the two is the wireless air interface. The mobile multimedia broadcasting service is sent from the transmitting system to the mobile multimedia broadcasting receiving system via the air interface in form of electromagnetic signal.

Figure 2:
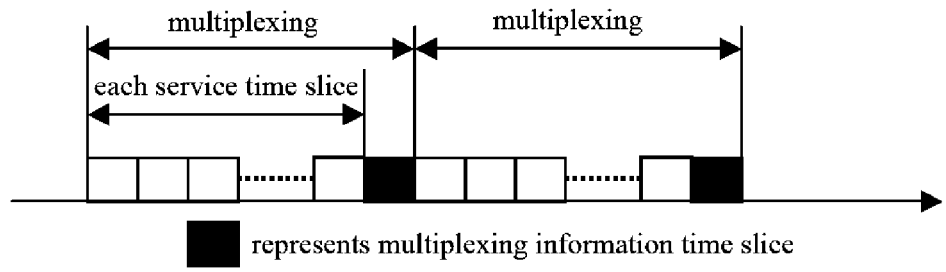
FIG. 2 is a diagram schematically showing the structure of multiplexing frame in the mobile multimedia broadcasting system.

The mobile multimedia broadcasting network system provides the receiving terminal with multiplexed signals. The structure of a broadcast frame is shown as FIG. 2, wherein in a broadcast frame a multiplexing information time slice is located in front of each service time slice. In the sending side of the mobile multimedia broadcasting system, the generating time of a broadcast frame is generally fixed or in other words the time period of a broadcast frame is fixed, for example, a broadcast frame is generated every 1 second.

In the sending side of the mobile multimedia broadcasting system, services are classified into fixed rate services and variable rate services and service type information is sent to inform the receiving terminal of the service type of each service. There can be many sending methods such as adding service type information in multiplexing configuration information for each service.

Figure 3:
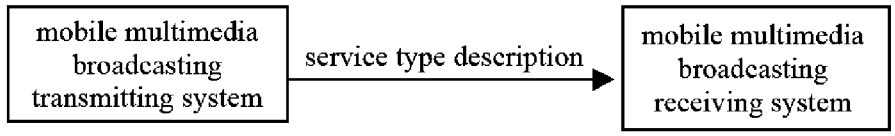
FIG. 3 is diagram schematically showing the process of informing service types.

In the mobile multimedia broadcasting network system, the service type description of each service is sent from the mobile multimedia broadcasting transmitting system to the receiving terminal, which is shown as the informing flow in FIG. 3.

In the process of multiplexing, multiplexing processing is implemented to the fixed rate services and variable rate services respectively. For the fixed rate services, it only needs to add an updating indication of multiplexing configuration information in the corresponding service time slice for indicating whether multiplexing configuration information is updated. For the variable rate service, the multiplexing configuration information in a next frame of the service can be provided in addition to the updating indication.

Figure 4:
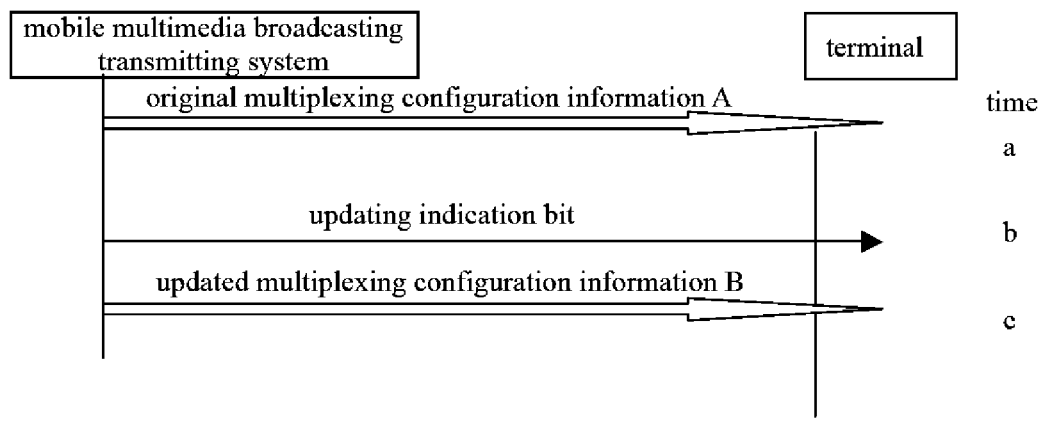
FIG. 4 is a flow chart of sending the updated multiplexing configuration information and updating indication bit.

As shown in FIG. 4, the updated multiplexing configuration information and updating indication provided to the receiving terminal by the mobile multimedia broadcasting network system are sent from the mobile multimedia broadcasting transmitting system to the receiving terminal, whose flow is shown as follows:

Flow a: the mobile multimedia broadcasting transmitting system sends the original multiplexing configuration information A;

Flow b: the mobile multimedia broadcasting transmitting system sends "updating indication bit" to the receiving terminal in advance of one frame;

Flow c: the mobile multimedia broadcasting system sends the updated multiplexing configuration information B to the terminals within its service area in the multiplexing information time slice.

Figure 5:
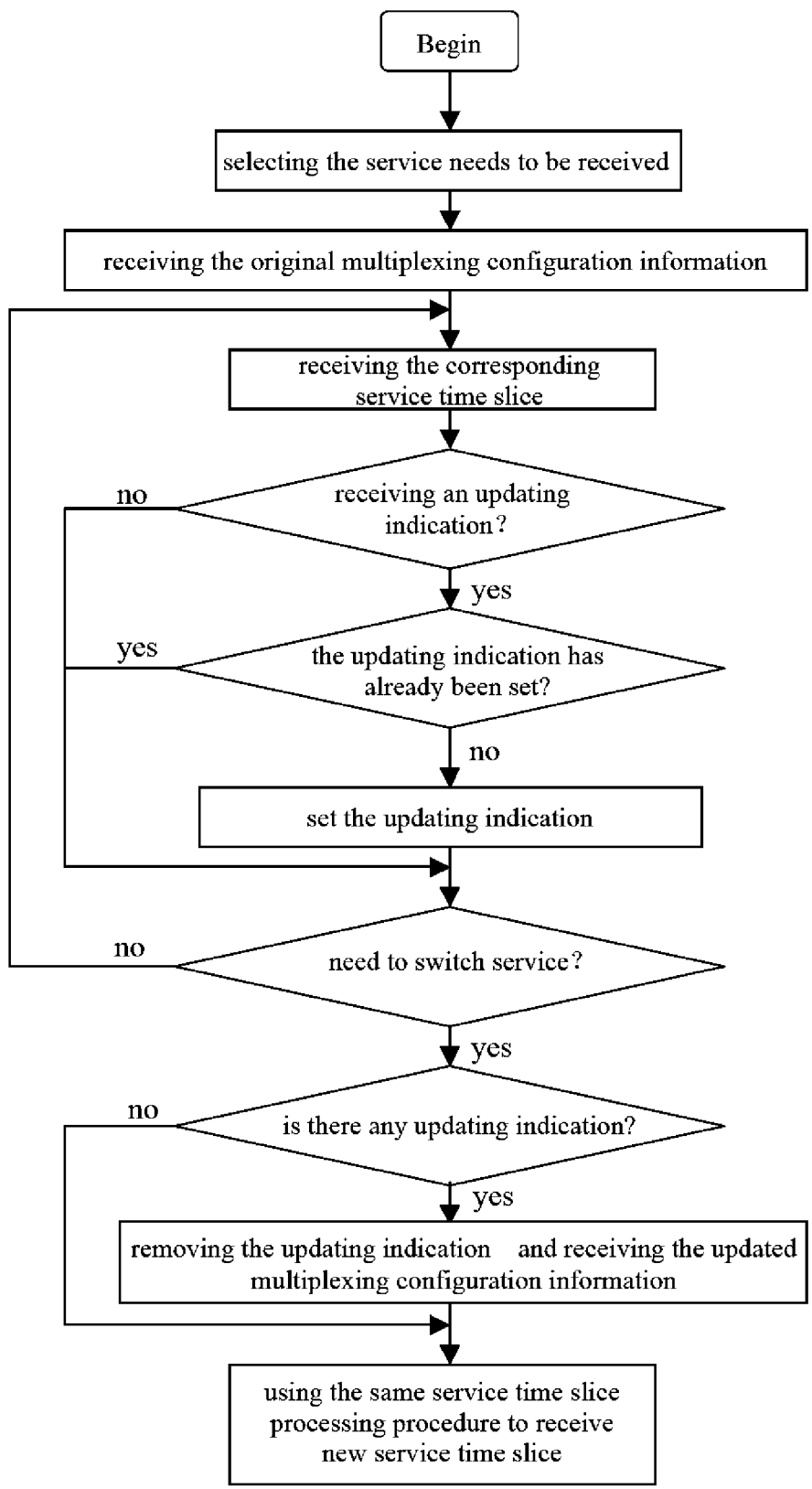
FIG. 5 is a process procedure of updating multiplexing configuration information and updating indication bit when the terminal uses a fixed rate service.

FIG. 5 schematically shows the updated multiplexing configuration information and updating indication process procedure of the receiving terminal in the receiving process of the fixed rate services. After powering on, the mobile multimedia broadcasting receiving terminal needs to receive multiplexing configuration information to acquire a certain service needed. In the process of receiving mobile multimedia broadcasting services with a fixed rate, when processing service time slices of each frame, the receiving terminal needs to process configuration updating indication until the first update appears. Then the receiving terminal sends an updating indication (which indicates that configuration information is changed and updating is needed) and since then it will not process the updating indication in service time slices any more. When wishing to turn to receive other services, the receiving terminal only needs to make use of the saved multiplexing configuration information A and does not need to receive multiplexing configuration information again, if it has cached the original multiplexing configuration information A and there is no updating indication; the receiving terminal needs to receive the multiplexing configuration information B over again, if it has not cached the original multiplexing configuration information or it receives an updating indication.

It can be seen from the above embodiments, compared with the prior art, the present invention can reduce the times of acquiring multiplexing configuration information by the terminal and can also reduce the number of auxiliary spending information and the processing complexity of the receiving terminal.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A service transmitting method of mobile multimedia broadcasting network, comprising the following steps:
   (1) a sending side of a mobile multimedia broadcasting system generates a broadcast frame in a fixed time period, implements multiplexing to different services according to service types and generates multiplexing configuration information, wherein a corresponding updating indication of the multiplexing configuration information is added in each service information slice as auxiliary overhead information for indicating whether multiplexing configuration information of a next frame is updated;
   (2) the sending side of the mobile multimedia broadcasting system firstly sends multiplexing configuration information to a receiving terminal at the beginning of a frame and sends the updating indication of the multiplexing configuration information to the receiving terminal in advance when the multiplexing configuration information needs to be changed;
   (3) when using services of the mobile multimedia broadcasting system, the receiving terminal firstly receives a multiplexing configuration information, then acquires the service needed according to the received multiplexing configuration information, and monitors whether the multiplexing configuration information is going to change by monitoring the updating indication; the receiving terminal stops monitoring and records the update situations once a decided updating indication is monitored;
   (4) when other services in addition to the current service needs to be received, the receiving terminal inquires whether situations of multiplexing configuration information update are recorded; if yes, the receiving terminal re-acquires multiplexing configuration information according to which the service needed is acquired, removes the recorded update situations and re-starts to monitor the updating indication of multiplexing configuration information.

2. According to the method in claim 1, wherein in the step (1), the mobile multimedia broadcasting system further informs the receiving terminal of the service type of each service by sending a service type notice.

3. According to the method in claim 2, wherein the service type notice is achieved by adding service type information in multiplexing configuration information.

4. According to the method in claim 1, wherein the service types comprise fixed rate services and variable rate services.

5. According to the method in claim 4, wherein the updating indication comprises a fixed rate service configuration updating indication and a variable rate service configuration updating indication.

6. According to the method in claim 1, wherein in the step (2), the sending side of the mobile multimedia broadcasting system sends an updating indication of multiplexing configuration information to the receiving terminal in advance of one frame when the multiplexing configuration information needs to be changed.

7. According to the method in claim 1, wherein in the step (3), it is further comprised that the receiving terminal caches the original multiplexing configuration information.

8. According to the method in claim 7, wherein in the step (4), when other service in addition to the current service needs to be received, the receiving terminal acquires the service needed by using the saved multiplexing configuration information if there is no updating indication.

* * * * *